INVENTOR.
Robert Brevko.
John R. Mucka.

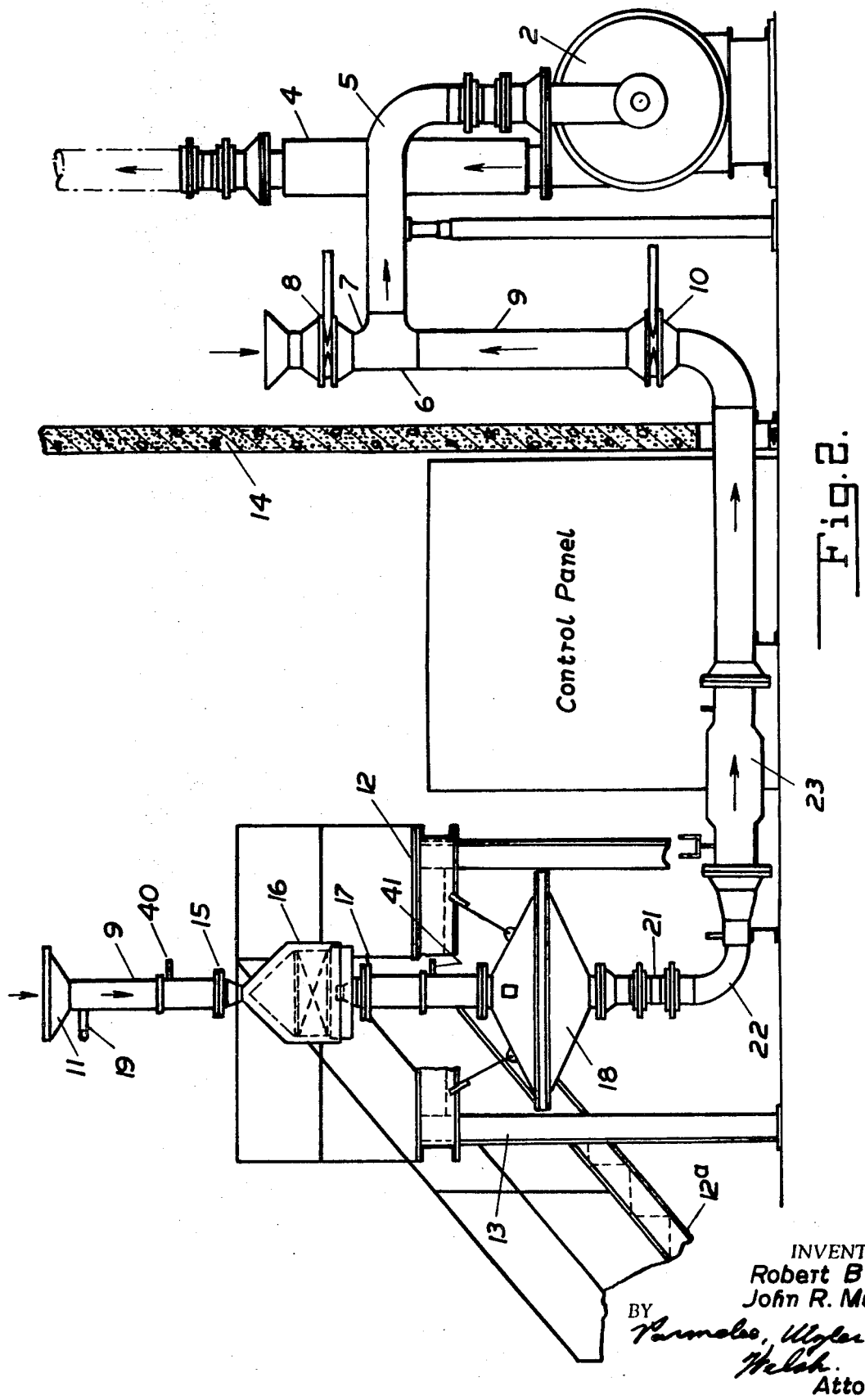

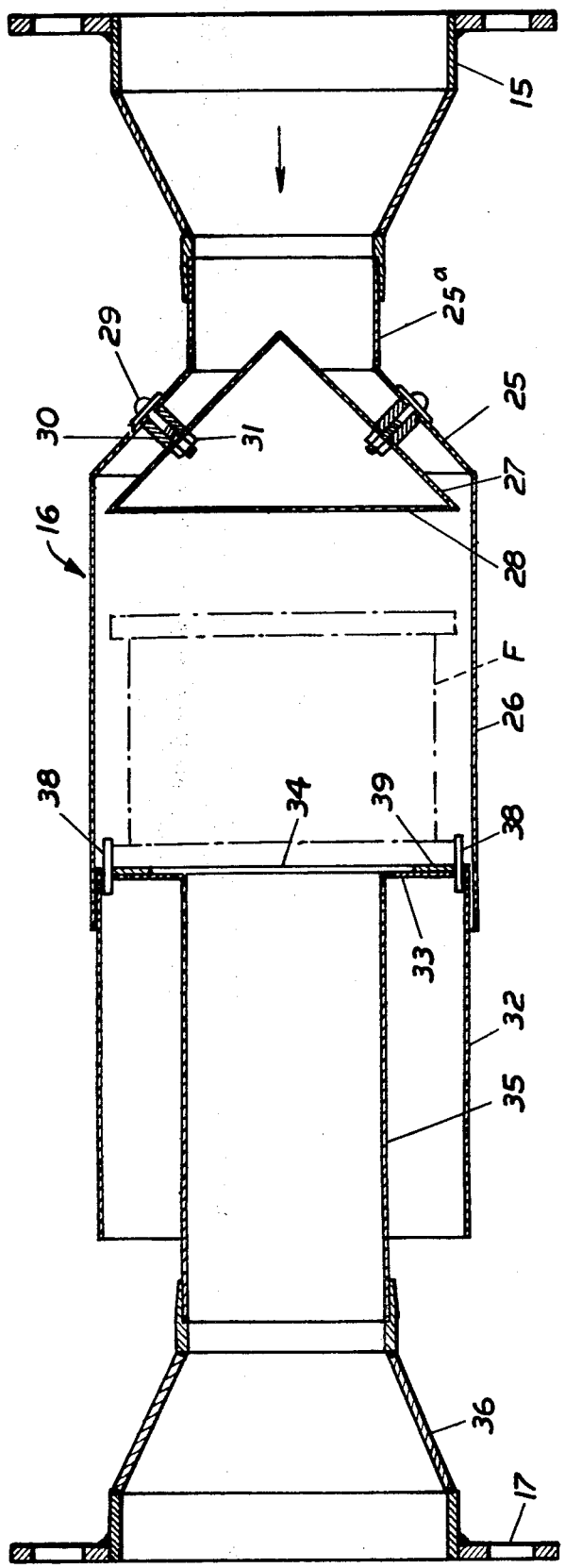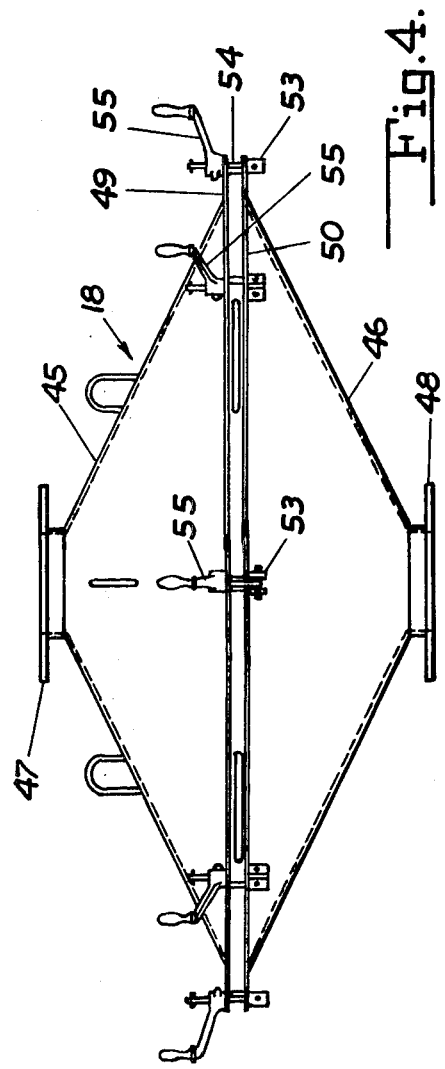

Attorneys.

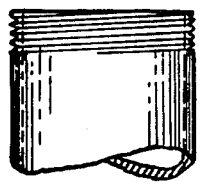
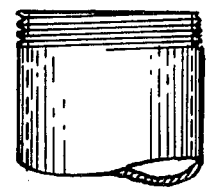
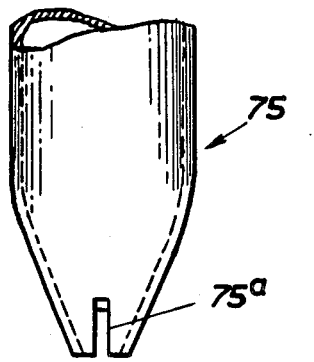
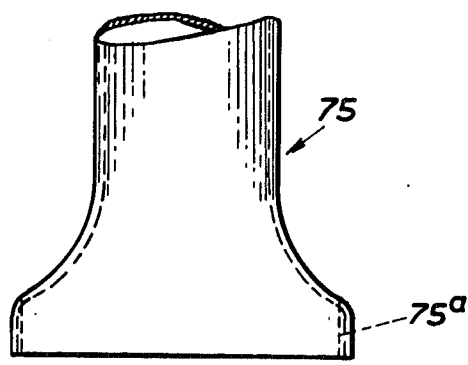
Fig. 9.    Fig. 10.
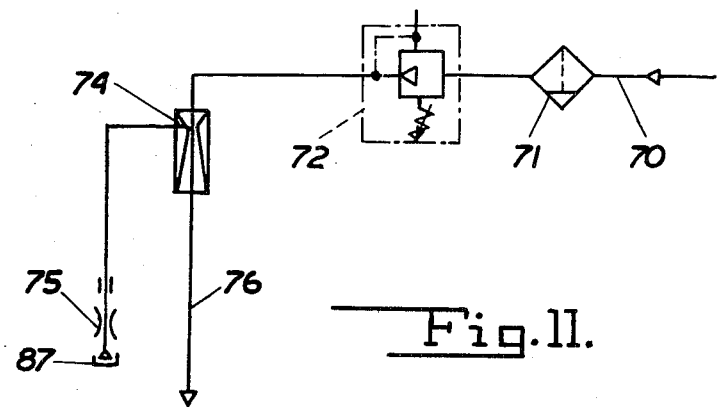
Fig. 11.

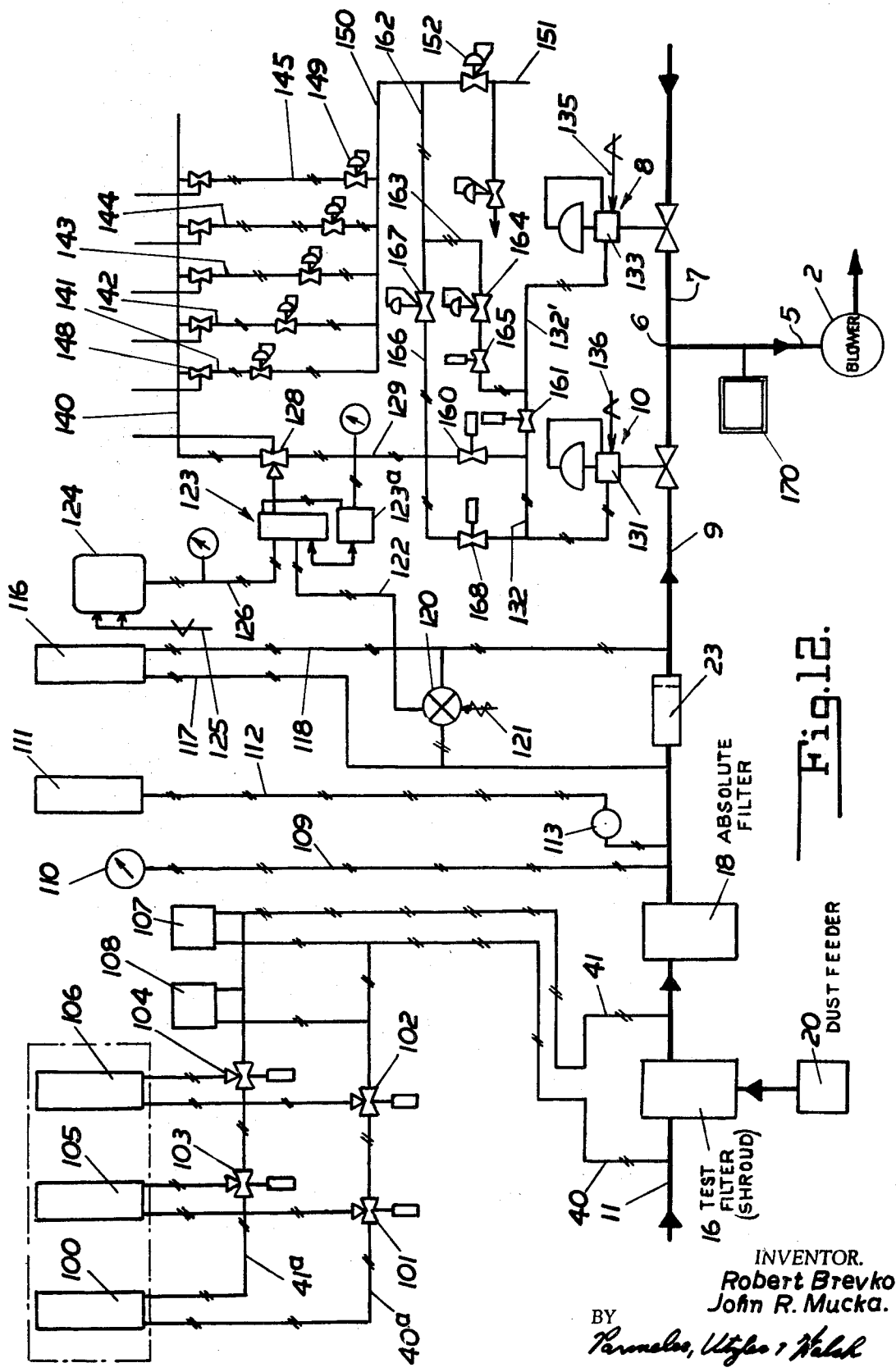

United States Patent Office 3,608,379
Patented Sept. 28, 1971

3,608,379
AIR FILTER TESTING APPARATUS
Robert Brevko, Peters Township, Washington County, and John R. Mucka, McCandless Township, Allegheny County, Pa., assignors to Auburn Engineering, Inc., Pittsburgh, Pa.
Filed Nov. 14, 1968, Ser. No. 775,621
Int. Cl. G01f 15/00
U.S. Cl. 73—432PS                      10 Claims

ABSTRACT OF THE DISCLOSURE

An improvement in air filter testing apparatus in which a measured amount of dust is drawn into a test filter at a controlled rate of the dust-laden air into the test filter is disclosed. Dust is drawn by an aspirator through a nozzle from an annular trough rotated at a predetermined speed and supplied to air flowing into the test filter. Air from the test filter is then drawn through an absolute filter. At the end of the test, the weight of dust on the air filter is compared to the weight of dust on the absolute filter and measured against the known weight of dust supplied to the apparatus to determine the performance of the air filter. Variable manual and automatic controls provide required programming and protection of the system against overload.

---

This invention relates to air filter testing apparatus and particularly apparatus for the testing of replacement air filters such as those used with automotive vehicle engines.

Manufacturers of paper used in air filters for automotive engines and other purposes, the manufacturers of filters, and purchasers of large quantities of such filters, select samples of filters at random for testing to determine the expected performance of the filters in the lot from which the samples are taken. The Society of Automotive Engineers have established performance tests for this purpose. According to such tests, air is drawn by a pump, preferably a motor-driven centrifugal compressor, through a test filter housed within a holder, known as a shroud, this air being laden with dust, Arizona desert dust being specified. A measured amount of dust is supplied to the air in a predetermined time period and controlled flow rate. After passing through the test filter, the air then flows through a second filter, known in the art as an absolute filter, to remove dust that may have passed through the test filter. At the end of the test period the ratio of dust on the test filter and the ratio of dust on the absolute filter with respect to the total known dust intake will determine the efficiency of the air filter. Another test may simply be a destruction test to determine the strength of the filter media under suction.

The present invention has for its object to provide an improved testing apparatus of this kind which may be manually or automatically varied to comply with the various test programs as to time, air flow, dust volume, etc. that may be desirable or required, and to do so with greater accuracy and with greater facility than apparatus provided for this purpose, and which incorporates protective arrangements against overload of the drive motor for the centrifugal compressor or other pump. Also the invention provides a new and improved dust-holding and pick-up arrangement, and an improved shroud or holder for the air filter being tested. Provision is made for varying the test from an automatic pre-set program to a manual operation selectively variable as the operator may require. These and other objects and advantages are secured with the invention.

In general, the apparatus comprises a motor-driven pump, preferably a centrifugal compressor, having an inlet for air, capable of developing a known vacuum at a predetermined rated capacity. The inlet to this pump is through two valve-controlled passageways, one of which opens directly through one valve to atmosphere, and the second of which is connected to an air inlet system where the air from atmosphere is drawn in series first through a holder or shroud containing the air filter to be tested, then through the absolute filter, having a removable filter element, then through a compensating flow meter and through the other of said valves to the pump.

Provision is made for introducing a measured amount of dust into this second passageway near the air intake terminal, and in advance, i.e., upstream, of the filter being tested, so that before the air passes through the test filter, it is charged with dust. To provide the required discharge of dust, there is a turntable on which is an annular trough into which the dust is placed, with the dust being leveled off to a predetermined depth by a strike-off tool is placed on the top of the trough and moved around the trough to level the dust off to a predetermined depth. A constant speed drive is provided to rotate the turntable and trough at a selected predetermined speed.

A suction nozzle of the width of the trough is connected with an aspirator in such manner that as the trough rotates beneath the nozzle, the dust is sucked into the nozzle and discharged into the air intake in advance of the test filter.

Provision is made to measure the pressure drop across the test filter, and as the filter clogs with dust, this pressure drop increases. Three manometers connected for sequential operation are used for this purpose, the first being a water tube manometer, the second an oil tube, and the third a mercury tube. Automatic sensing means responsive to the increase in pressure drop across the test filter cuts out the first manometer, which is the water tube one, and selects next the oil tube one, and then as the pressure drop builds up, cuts out the oil tube manometer and renders the mercury tube operative since the water tube manometer will show the greatest response with small changes in pressure drop that occur when the filter is fresh and clean, whereas the mercury shows the least movement when the changes are greatest, as when the filter becomes increasingly clogged, and the response of the oil-tube manometer is intermediate the mercury and water.

Following the absolute filter, there is a thermometer to measure the temperature of the air flowing through the system, and then an absolute pressure manometer. Then there is a laminar flow element in the air line, and an inclined manometer connected into the line upstream and downstream of the flow element, the inclined manometer and flow element comprising a flow meter, and the inclination of the manometer can be adjusted to compensate for the temperature and barometric pressure of the air, in a well-known manner. There is also a differential pressure transmitter connected across opposite sides of the flow element. There is a known type of clock-driven analog programmer, driven at a pre-determined constant speed with a replaceable or interchangeable program element. The programmer and differential pressure transmitter control air flow to a common controller where their functions combine to operate a pneumatic circuit to increase the opening of one of said two air inlet valves to the compressor, and correspondingly decrease the other. This arrangement is such that as air flows in response to the pressure differential across the flow element, and/or as the programmer calls for an increase in the flow rate in the air filter testing line, the free flow of air to the compressor inlet from atmosphere is diminished, and vice versa, so that the total air supply to the compressor is normally constant, thereby avoiding changing loads on the compressor motor and giving more accurate test results.

A manual control system is provided to selectively replace the automatic arrangement just outlined provided by the flow meter-programmer-differential pressure transmitter combination, and the automatic combination can be rendered inactive for manual operation or destructive testing.

The apparatus provides, therefore, a testing unit which enables various tests to be run and accurately repeated with successive test filters. It is flexible for different tests, both automatic and manual, and since the pump always operates at its rated optimum capacity, the apparatus avoids destructive loads on the pump and motor, and test results are more reliable than where there is a constantly changing load on the pump driving motor.

The invention may be more fully understood by reference to the accompanying drawings, wherein:

FIG. 2 is a side elevation of the apparatus shown in FIG. 1 with the dust feeder omitted;

FIG. 3 is a vertical section on a larger scale of the test filter container or shroud apart from the other apparatus;

FIG. 4 is a detail view showing in side elevation the absolute filter unit;

FIG. 9 is a detail side elevation of the dust pick-up nozzle;

FIG. 10 is a front elevation of this nozzle;

FIG. 11 is a schematic diagram of the dust feeder system;

FIG. 12 is a schematic diagram of the pneumatic circuits for the apparatus other than the dust feeder.

Figure 1:
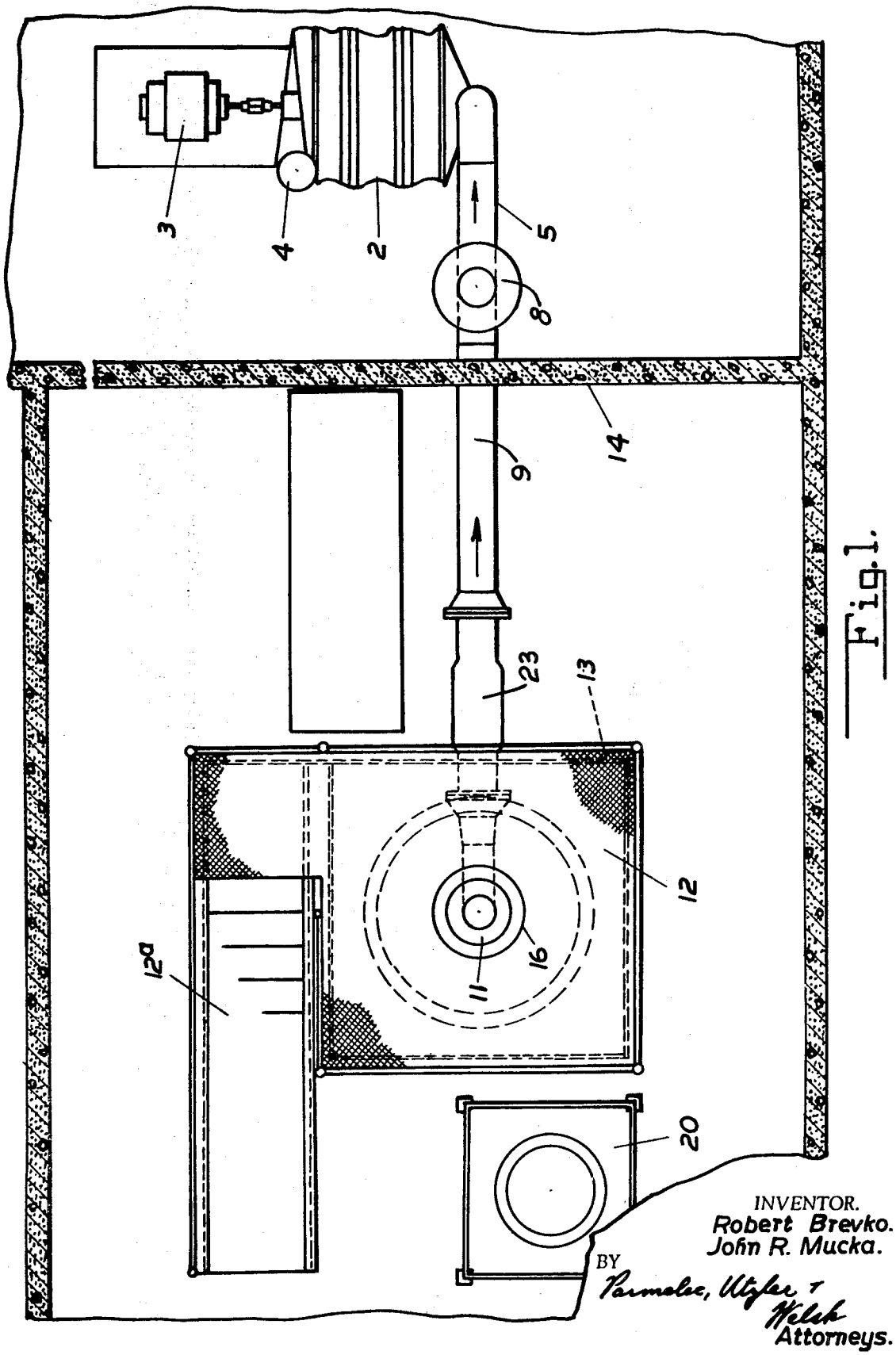
FIG. 1 is a top plan view of the apparatus, the view being generally schematic to show the relative position of the different parts.
Figure 6:
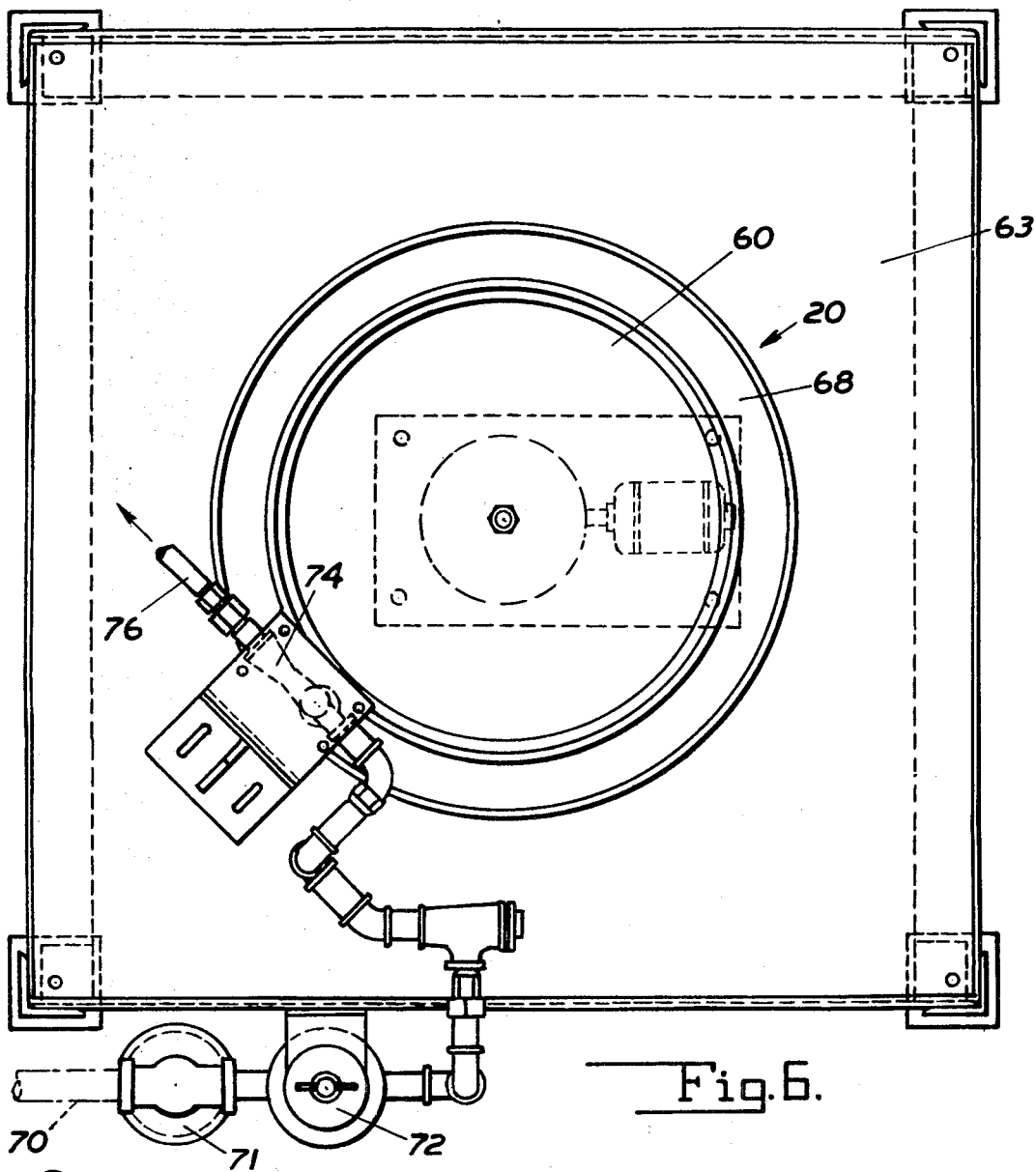
FIG. 6 is a plan view of the dust feeder.

In the drawings illustrating a preferred embodiment of the invention, 2 designates a rotary centrifugal compressor or other uniform output pump means driven by an electric motor 3. For illustration, it may be 2000 c.f.m. output, equivalent to 5.9 p.s.i. It has an exhaust pipe 4 and an air inlet connection 5 leading to a T connection 6. One branch 7 of the T connection opens to atmosphere through a control valve 8 that is power-positioned by a pneumatic actuator such as a diaphragm-operated valve, or as here diagrammatically shown, is a light-duty butterfly valve with a pneumatic positioner.

The other branch 9 comprises the filter testing passage, and it has a valve 10 therein similar to valve 8, located relatively close to the T connection 6. Air flow to the pump is thus divided between two valve-controlled intake passages. As will be hereinafter explained, the valves 8 and 10 are so operated that as one restricts flow therethrough the other proportionately opens, and vice versa, so that under most operating conditions the air flow to the pump is constant, and the motor is protected against overload as the flow through passage 9 changes during testing.

The air intake end of passage or pipe line 9 is designated 11, and is at an elevated level above a platform 12 carried on a supporting structure 13 in a room, preferably separate from the pump, as indicated by partition wall 14. Access to the platform 12 is by stairs 12a. The inlet terminal 11 has a laminar flow-generating nozzle (not shown) of usual construction therein.

Below the inlet, there is a separable coupling 15 and reducer for removable connection with the test filter holder or shroud, designated generally as 16, and the lower end of the shroud has a second separable coupling 17 to a pipe section that passes down through the platform 12 to the absolute filter unit 18. Above the shroud 16 and below the inlet terminal 11 there is a nipple 19 to which a hose (not shown in FIGS. 1 and 2) leads to a dust feeder, schematically indicated in FIG. 1 at 20, and hereinafter described in detail.

The absolute filter 18 has its lower end coupled through a rubber coupling sleeve 21 to an elbow 22 which is followed by a laminar-flow element 23 of known construction, and which includes an orifice plate. Beyond the flowmeter, the air flow is through the pipe 9 and valve 10 as above explained.

THE SHROUD

The shroud 16, shown in detail in FIG. 3, comprises an upper inverted conical hood 25 with an extension 25a that forms a reducer, and to the top of which is secured one part of the flanged separable coupling 15. The lower end of the hood is integral with a cylindrical casing 26. There is a conical deflector 27 concentrically positioned within the hood. It has a closed circular bottom plate 28. It is held in position by three equally-spaced screws 29 (only two of which may be seen in the drawing) that pass through spacers 30 welded into the hood and bearing against the cone. These screws thread into bosses or fixed nuts 31 inside the cone. This entire assembly may be designated the upper section of the shroud.

It may be here explained that air filters are made in different diameters and in different heights. Each diameter requires a different shroud, but one shroud will accommodate all of the different heights of one diameter. This is by reason of the shroud having a lower section that is removably telescoped into the upper section. The two sections are separated for the insertion of the filter to be tested, and by reason of the telescopic fit of the two parts, they can adjust to the height of the filter.

The lower section comprises a cylindrical sleeve 32 which has sliding fit in the casing 26. At the top end of this sleeve there is a disk 33 with a central opening 34, and a tubular extension 35 extends down from the opening beyond the sleeve 32 and terminates in a flanged fitting 36 that forms part of the separable coupling 17. There are at least three equidistantly-spaced pins 38 on the top of the disk 33 equally distant from the center of the disk. The filter to be tested is set on the disk and held centered by the pins. A typical filter is indicated by broken lines in FIG. 3 and designated F. There is a rubber ring or annulus 39 on the disk through which the pins pass, and on which the filter is set.

When the filter is placed on the disk, the bottom section of the shroud is pushed up into the upper section until the top of the test filter is confined against the flat plate 28 forming the bottom of the deflector. The shroud is then connected into the system by bolting the flanged couplings 15 and 17. The pipe section with the air inlet is carried by the hood of the shroud, so that its weight is on the top section of the shroud, and this weight is supported by the test filter under the plate 28. A band of adhesive tape (not shown) is wrapped around the bottom of the casing 26 and onto the sleeve 32 to cover the sliding connection between the upper and lower sections to form a temporary seal and prevent any air from entering between the telescoping parts.

It will be understood that while shrouds of different diameters are interchangeably used for filters of different diameters, the parts 25a and 35 are always of a standard size.

Manometer lead inserts are included in the passage 9 above and below the shroud connections 15 and 17, as indicated at 40 and 41, respectively.

THE ABSOLUTE FILTER

Figure 5:
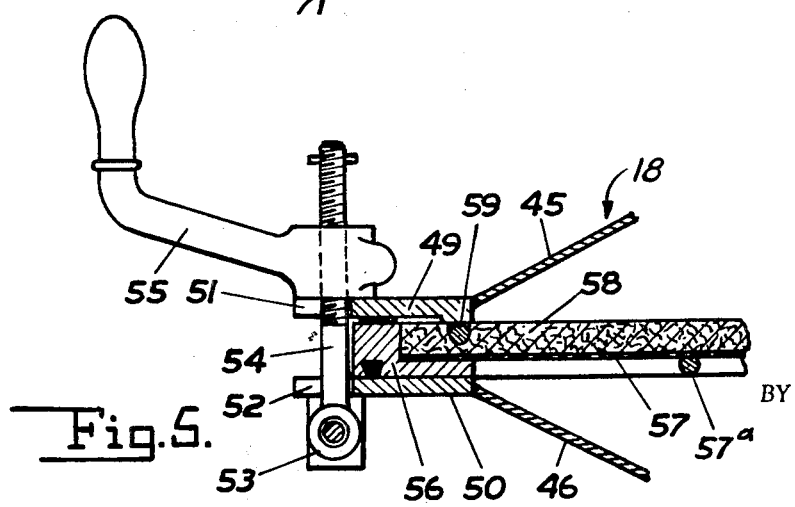
FIG. 5 is a fragmentary vertical section through a portion of FIG. 4.
Figure 7:
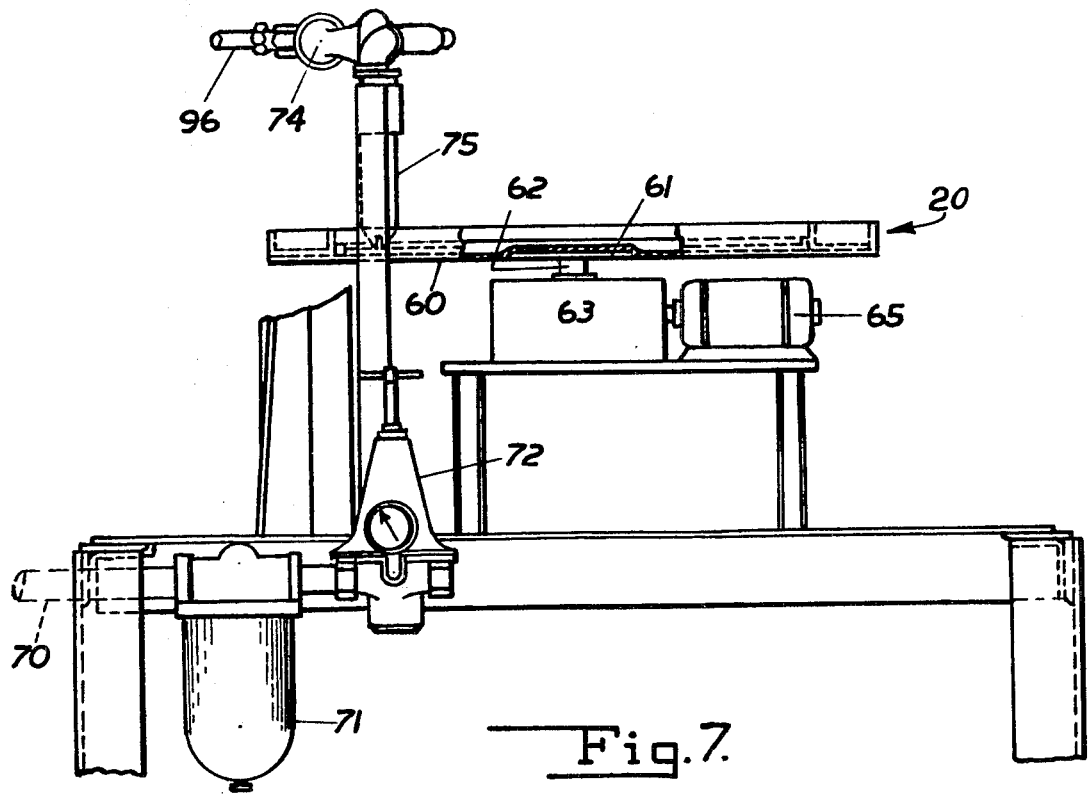
FIG. 7 is a side elevation of the dust feeder.

The absolute filter 18 is shown in detail in FIGS. 4 and 5. It comprises two similar hollow cones with the hollow interiors confronting each other. The upper one is 45 and the lower one is 46. Each has an opening through the small end of the cone with a bolt-flange therearound, these being designated 47 and 48, respectively, for removably coupling them into the pipe line, as indicated in FIG. 2. The large confronting ends of the cones have flanges 49 and 50, respectively. The upper flange 49 is notched, as indicated at 51 in FIG. 5 at a plurality of equally-spaced places around the periphery, and the flange 50 of the lower cone has correspondingly positioned notches 52 therearound. Lugs 53 on the underside of the flange support pivoted bolts 54, one bolt at each notch, arranged so that they may be swung from the vertical position shown in FIG. 5 clear of the notches for quick release of the two sections, there being a crank-handled clamping nut 55 threaded on each bolt. There is a removable rabbetted annulus 56 between the flanges 49 and 50 with sealing gaskets above and below, as shown. A coarse wire cloth disk 57 set on the ledge of the annulus and grid members 57a support a replaceable thick circular glass fiber mat filter 58, the area, thickness and specifications for which are made to S.A.E. standards. These filters are for single use and are therefore expendable.

In use the filter is tightly clamped between the two sections 45 and 46, while a clamping ring 59 compresses the filter pad around its periphery. After each test, the crank nuts are loosened, the clamping bolts released, and the annulus 56 with the filter pad is removed. By weighing the pad for an increase in weight, the weight of the dust passing through the test filter in the shroud can be determined, as is well understood in the industry. The rubber sleeve coupling at 21 provides sufficient flexibility to allow separation of the two cone sections to allow for the removal of the annulus and filter pad, and the replacement of the annulus with another pad for the next test.

THE DUST FEEDER

The dust feeder, schematically indicated in FIG. 1 at 20, is designed to feed a predetermined amount of dust into the air intake pipe upstream from the test filter in a predetermined time interval. It is shown in FIGS. 6 to 10 inclusive.

The feeder comprises a turntable 60 of a selected size, preferably something of the order of around twenty-four inches in diameter. It has a recess centered in its under surface to receive a disk 61 on shaft 62 coming through the top of a speed reducer housing 63 for a speed reducer. This speed reducer is driven by an electric motor 65 at a constant speed. Typically the turntable 60 is rotated at a speed of one revolution per hour. There is a shoulder or curb 66 on the top of the turntable, spaced inwardly from the periphery, providing a marginal supporting area 67 for receiving and holding centered an annular removable dust-holding trough 68. It has a predetermined known width and depth.

Depending on the test to be run, a weighed amount of dust is poured into the trough and leveled off to a predetermined depth. This can be rapidly accomplished by using a strike-off tool or screed marked S in FIG. 8, which is of T-shape so that the cross-bar of the T rests on the sides of the channel and the stem, which has a sliding fit in the channel, extends down to the desired level. It is held in the operator's hand and moved around the trough, leveling off the dust and pushing excess ahead of it. The weight of the dust will have been previously determined, so that approximate to uniformity of the dust layer so leveled out is adequate. Different tools S may be provided for different depths of dust.

An air line 70 connected to a source of compressed air (not shown) has an air line filter 71, and a pressure regulator with a gauge 72 therein. It supplies air to an aspirator 74 located above the trough of the turntable. The aspirator is adjusted to generate a desired suction and functions to draw dust from the trough through a depending nozzle 75. A side elevation of this nozzle is shown in FIG. 9, and a front view in FIG. 10. It has a tubular body that tapers to a narrow inlet slot as viewed from the side and flares outwardly to just fit between the sides of the trough as viewed in FIG. 10. The tips of the flared ends of the nozzle have vertical slits or kerfs formed therein as indicated at 75a in FIG. 10 to remove dust from the corners and sides of the trough. Typically the bottom of the nozzle is ten mils. (.010 inch) above the bottom of the trough. The dust and air from the aspirator are discharged into a hose 76 that is attached to the dust inlet nipple 19 (FIG. 1).

In operation, the aspirator is operated while the turntable is rotated by its clock or constant speed motor and speed reducer. With the trough containing a measured amount of dust, practically all of the dust will be removed from the trough in a predetermined period of time and at a substantially uniform rate during the period, which in most cases is one hour. The trough is made removable so that, knowing its weight, it can be removed and weighed after each test to determine how much dust (which may cling to the metal) remains.

The operation of the dust feeder system may be easily followed by reference to the diagram in FIG. 11. In this figure the various elements are numbered to correspond to the numbering of the corresponding parts in FIGS. 6–10. Air regulated by the regulator 72 from the source of supply (not shown) flows through the pipe 70 to the aspirator 74. This creates a suction at the nozzle 75, lifting dust from the channel or trough 68. The dust and air from the aspirator are delivered through the hose 76 to the air intake nipple at 19 below the air intake 11 and upstream from the shroud.

THE CONTROL CIRCUIT DIAGRAM

Referring to the diagram in FIG. 12, the complete control circuit for the apparatus, and comprising a part of it, is shown. The main suction lines in the diagram are heavy, the pneumatic signal lines are light and marked with double diagonal markings, and air pressure supply lines are marked with an angle mark (<). The parts of the apparatus corresponding to the parts hereinbefore described are indicated by corresponding reference numerals. The pump is 2; the air intake to the pump is 5; the T connection is indicated at 6, and 7 is the branch that leads directly to the atmosphere through power-positioned valve 8. The branch 9 which contains the various parts of the test equipment, has included therein the air inlet from atmosphere at 11; the shroud 16; the dust feeder 20; the absolute filter 18; the flow element meter 23, and the power-actuated valve 10.

Reference has previously been made to the manometer connections 40 and 41, upstream and downstream respectively, of the shroud. 40 and 41 are actually tubes leading to a multiple manometer arrangement containing a water tube manometer, an oil tube manometer, and a mercury tube manometer. Water tube manometer, designated 100, is connected to the lines 40 and 41 through lines 40a and 41a respectively. Line 40a includes two solenoid-actuated three-way valves in series, one of these being designated 101, and the other 102. In line 41a there are similar solenoid valves 103 and 104. In the start-up of the operation when the test filter is relatively clean, the pressure drop through it is relatively small. The water tube manometer tube 100 functions first so that at this time the three-way valves 101 and 102 are open to the manometer 100, as are also the valves 103 and 104. The oil tube manometer is designated 105 and the flow to this manometer is closed by the valves 101 and 103. The mercury tube manometer is designated 106, and the fluid pressure flow to it at the start-up is blocked through the solenoid valves 102 and 104. Since the water is the lightest fluid, the manometer 100 will have the greatest response when the increments of pressure drop are relatively small. When there is a predetermined pressure drop across the test filter, pressure-responsive switch 107 will energize the solenoid valves 101 and 103 to block the flow of fluid pressure to the water tube manometer tube 100 and open the flow to the oil tube manometer. As the pressure rises still higher, the pressure-responsive switch 108 connected across the lines 40 and 41 will then energize the solenoid valves 102 and 104 to block the flow of fluid pressure to the valves 101 and 103 and open the flow to the mercury manometer tube 106. The greatest pressure drop occurs as the test filter becomes increasingly clogged, and since the mercury is heavier than oil or water, and so fluctuates less widely, it is used to detect the pressure drop at the high range of the test period.

Figure 13:
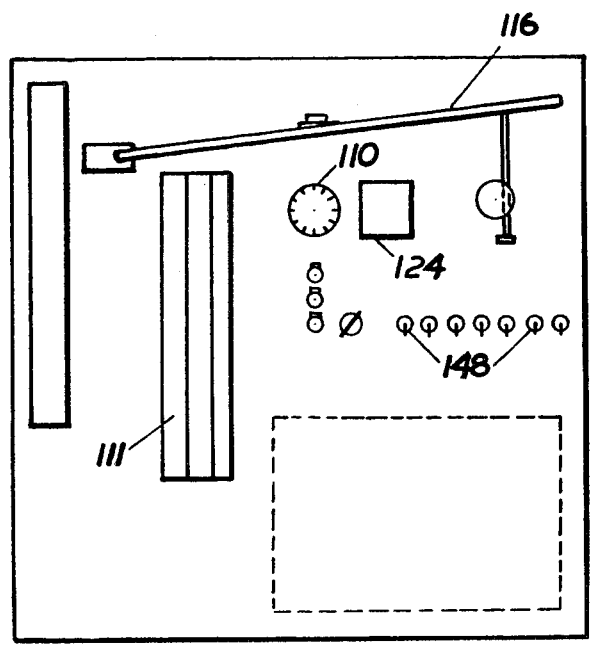
FIG. 13 is a schematic view showing instrumentation at the back of the control panel.
Figure 8:
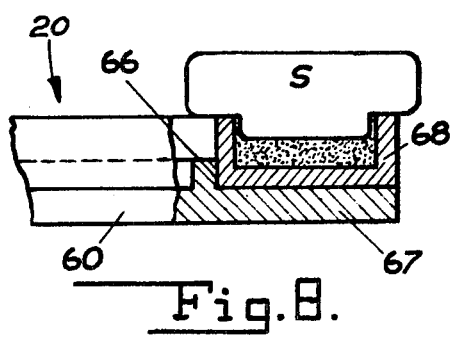
FIG. 8 is a fragmentary side elevation of the dust feeder.

Beyond the absolute filter there is a thermometer located in the pipe 9 with a capillary tube 109 leading to a temperature indicator 110. There is a flow element 23 in the line following the thermometer. It is a commercially available unit providing a venturi with internal divider plates for creating a laminar air flow therethrough as well as a pressure drop thereacross. An absolute pressure manometer 111 is connected into line 9 at the upstream side of the flow element 23 through tube 112 in which is a conventional sediment trap 113. The thermometer and absolute pressure manometer enable compensation to be made for variations in atmospheric temperature and barometric pressure, respectively. There is an inclined manometer, calibrated in terms of flow rate, at 116. It is connected across the two sides of the flow element 23 through lines 117 and 118 upstream and downstream of the flow element, respectively. In FIG. 13 the absolute pressure manometer and inclined manometer are indicated on the control panel P. The adjustably inclined manometer in combination with the flow element comprises a compensating flow meter. The units here used are commercially designated Meriam 42HE35WM.

There is also a differential pressure transmitter 120 connected across the lines 117 and 118, and with an outside source of air pressure 121. This instrument is of a type known in pneumatic circuitry. Moore model 15A1 is suitable for this purpose, and it controls the flow of air from source 121 through outlet pipe 122 to a controller proportionately to the differential pressure across the flow element 23. There is also an analog programmer 124 that is clock-driven, and which varies air flow from a supply source 125 into line 126 to the controller 123 according to a replaceable program element on the programmer. The programmer is a commercially available unit, such as Moore model 575C3 and the controller is also a standard device, such as Moore Catalog No. 50F. The controller combines the functions of the programmer and differential pressure transmitter and it is connected to a valve 128. This valve is a three-way valve that may be shifted from an automatic control, where pressure signals from the controller are effective, to manual control. Under automatic, the controller is connected through valve 128 to line 129 and line 132–132′ to reversely-acting power actuators 131 and 133 of the valves 10 and 8 respectively. The pressure admitted in this way is opposed to constant pressure supplied through line 135 and 136 to the valve actuators for valves 8 and 10, respectively, the actuators being so arranged that as one valve moves toward full open position, the other moves toward the full closed position. In a reverse operation, the pressure in line 132–132′ and 129 is decreased through the controller 123.

The programmer is of a type having a replaceable program element about which is cut a groove of a predetermined contour so as to increase or decrease the signal transmitted to the controller 125 to simulate different motor vehicle speeds, while the differential pressure transmitter responds to dust build-up in the test filter and the resulting air flow restriction. This programmer is clock-driven, i.e., driven at a uniform selected speed. If the test pattern calls for the test to be conducted with a variable flow, or flow which is increased or decreased at predetermined timed intervals, the programmer will effect such operation by changing the relative positions of the valves 8 and 10. To increase the flow of air through the filter under test, the valve 10 is opened further, and the valve 8 is closed further, and to reduce the flow of air through the filter under test, of course, the opposite action of the valves 8 and 10 is effected, the valve 8 being opened further, and the valve 10 being moved further toward a closed position. Also as the flow of air through the test fiilter diminishes, the differential pressure transmitter will signal the controller 125 to increase the opening through the valve 10 and decrease the opening through the valve 8 to thereby compensate for the increase in the pressure drop across the test filter. The suction in the dust pick-up nozzle can be regulated by pressure regulator valve 72.

By reason of this arrangement the entire test according to the pre-arranged program can be automatically conducted.

The automatic arrangement provided by the programmer 122 and the differential pressure transmitter 120 can be selectively cut out for manual control by the additional circuits shown in FIG. 12. By actuating the selector valve 128 to the manual position, it may be held open so that a pressure circuit is established through line 129 to line 140. There are a series of branch lines numbered consecutively from 141 to 145. Each of these includes a manual toggle valve 148 mounted on a panel board along with the other instrumentation, which panel board is shown schematically in FIG. 13. Each of these lines also includes a separate pressure-regulating valve 149. The lines 141 through 145 are connected to a manifold 150, to which air is supplied from an external source (not shown), through line 151 and pressure regulator 152. With this arrangement, air is supplied through a selected one of the lines 141 and 145 by operating one of the toggle valves 148, whereupon air can flow from the inlet 151 at regulated pressure through the manifold 150 and through the pressure regulator valve 149 in the selected one of the several tubes to the pipe 140 to vary the pressure therein and thereby vary the pressure through valve 128 to the power-actuated valves 8 and 10 to actuate them in opposite directions, and through the valve 128 down to the two valves 8 and 10. Each of the pressure regulators 149 in this arrangement would be so adjusted that the pressure in the several lines 141 to 145 will be stepped down or up from 141 to 145 in increments.

By either the use of the automatic programmer and regulator, or by means of the manual system, it is possible to regulate the flow of air through the test filter. Using the automatic system, this regulation may occur in an infinite number of steps. According to S.A.E. standards, the automatic range is betweeen 200 s.c.f.m. minimum and 800 s.c.f.m. maximum. On manual operation the range is between 0 and 2000 s.c.f.m., depending on the settings of regulators 149. With the manual system, the variation is necessarily in fixed increments or steps, depending on the number of lines in the several manual series 141 to 145. By using more than the five illustrated, the steps may be in smaller increments, and using fewer than five, the increments will of course be larger.

At 123a there is indicated a pneumatic stabilizer for stabilizing the controller to prevent "hunting." It is available commercially, one such available unit is "Nulmatic" Derivative unit, Model 59.

Pressure regulator 155 reduces line pressure from a source of air supply to provide a regulated flow, typically 20 p.s.i. to the programmer 124, controller 123, and differential pressure transmitter 120.

In starting up the apparatus, the compressor should start with "no load," and therefore both valves 8 and 10 should be closed. To this end there is a solenoid valve 160 in line 129 which is opened only after start-up. There is a blocking solenoid valve 161 in that branch of line 132, designated 132′, that leads to valve operator 133 of air flow valve 8. It is closed until after start-up. There is an air supply line 162 leading from the downstream side of pressure regulator 152 to branch line 163 in which is a regulator 164 set to a lower pressure than regulator 152, and in which is a solenoid valve 165 that is open at start-up, and through which air is supplied to valve operator 133. There is a second branch line 166 from line 162 leading through pressure regulator 167 and solenoid valve 168 to valve operator 131 for air flow valve 10. Since valves 8 and 10 operate oppositely, solenoid valve 168 is also open at start-up. With this arrangement both valves 8 and 10 are closed prior to start-up. After the compressor has reached operating speed, solenoid valves 160 and 161 are opened, and solenoid valves 165 and 168 are closed, and valves 8 and 10 are then controlled by pressure in lines 129 and 132–132'. A vacuum switch 170 in the air intake pipe 5 to the blower controls the operation of the programmer. A timer (not shown) connected into the motor start-up circuit de-energizes solenoids valves 165 and 168 to close them, and energizes solenoid valves 160 and 161 to open them, to thereby effect the switch-over of the pneumatic circuits from start-up to operating conditions. Wiring circuits are conventional and have not been shown.

The dust pick-up arrangement as herein provided supplies dust to the testing apparatus much more accurately and uniformly than apparatus heretofore available. Typically this is at the rate of 1.5 grams per s.c.f. per hour at 800 s.c.f.m. per hour. The shroud is unique in that it centers the test filter and distributes the incoming dust-laden air uniformly thereabout, and the test filters can be quickly inserted and removed. The apparatus in its entirety constitutes an improvement over apparatus heretofore provided, first in that it gives greater flexibility for programming, more exact control of the feeding of dust to the test filter, and more uniform duplication of an established test program with successive filters, so that a succession of filters can be subjected to tests which are identical for all practical purposes, except as may result from the character of the filter itself. Since the supply of air to the pump 2 is constant during normal testing, the pump operates at uniform speed and without fluctuations due to changing loads on the driving motor. By the inclusion of valves so arranged as to completely close the valve 8, all of the air can be drawn through the test filter for the destructive testing of the filter. This, however, temporarily eliminates all protection against overloading the pump-driving motor. The start-up arrangement assures that the test of a filter cannot occur until an air-flow meeting test standard is established and the motor is not required to accelerate under full load conditions. Certain known equipment has been specified by name and manufacturer's number in order that one skilled in the art may quickly know the type of unit that is suitable, and not by way of limitation. There are a wide range of tests both with saw-tooth or up-and-down air flow as predetermined by the programmer, or at various constant air flow conditions as established either by manual or automatic operation.

We claim:
1. An air filter testing apparatus comprising:
 (a) a motor-driven air pump having an inlet,
 (b) means providing two separate passageways for air from the atmosphere to said pump inlet including an air flow regulating valve in each passageway, the first of said passageways opening to atmosphere through its flow-regulating valve,
 (c) the second passageway being continuous and including in succession in the direction of flow of air therethrough, an air inlet opening to atmosphere, means for introducing and mixing dust into the passageway to mix with the air flowing therethrough, a shroud for receiving and holding an air filter to be tested therein arranged in such manner that air in which the dust is mixed must pass through the filter so positioned in the shroud, an absolute filter having a removable filter element therein for collecting dust that passes through the filter under test, a flow meter for detecting the flow of air through the passageway followed by the aforesaid flow-regulating valve which is in the second passageway, and
 (d) control means for effecting simultaneously the moving of one of said valves to proportionately restrict air flow therethrough as the other is operated to increase air flow through it and vice versa to maintain the total flow of atmospheric air to the pump constant.

2. An air filter testing apparatus as defined in claim 1 wherein said control means is arranged to respond to fluctuations in pressure in said second line between the absolute filter and the regulating valve in said line whereby it may function to compensate for increase in the resistance of the flow of air through the filters as dust accumulates therein.

3. An air filter testing apparatus as defined in claim 1 wherein there is a clock-driven programmer arranged to operate said control means to open and close one of said air flow regulating valves and oppositely operate the other of said air flow regulating valves according to a predetermined program.

4. An air filter testing apparatus as defined in claim 1 wherein there is both a clock programmer and means responsive to pressure in said second passageway, and the control means is operatively connected with and responsive to both.

5. An air filter testing apparatus as defined in claim 1 wherein there is a selectively operable manual control means for effecting the setting of the regulating valves in a plurality of preselected positions.

6. An air filter testing apparatus as defined in claim 1 wherein there is a clock-driven programmer arranged to operate said control means over a predetermined time period, and said means for supplying dust has means for operating the same at a constant rate irrespective of the air flow variations effected by the programmer.

7. An air filter testing apparatus as defined in claim 6 wherein said means for supplying dust comprises:
 (a) a turntable having a circular trough thereon concentric about the center of rotation of the turntable,
 (b) a fixed dust pick-up nozzle terminating in said trough,
 (c) means for creating a suction in the nozzle and discharging the dust and air entering the nozzle into said second air flow passage, and
 (d) means for rotating the turntable relative to the nozzle at a constant speed.

8. An air filter testing apparatus as defined in claim 1 wherein other control means is provided to eliminate air flow through the filter to be tested until the motor reaches a maximum speed.

9. An air filter testing apparatus as defined in claim 1 wherein means is arranged to maintain both air flow regulating valves closed at start-up and until the motor-driven pump reaches a predetermined operating speed.

10. An air filter testing apparatus as defined in claim 9 wherein said control means for the air flow regulating valves comprises a pneumatic circuit with a controller and solenoid-operated valves in said circuit arranged to maintain both air flow control valves closed until the motor reaches a predetermined operating speed, a timer in the pump motor circuit arranged to operate said solenoid valves to render the control means operative, a programmer for governing the controller, and a suction switch in the inlet of the pump for controlling the solenoid valves.

References Cited
UNITED STATES PATENTS

| | | | |
|---|---|---|---|
| 2,833,140 | 5/1958 | Austen et al. | 73—38 |
| 2,857,756 | 10/1958 | First | 73—38 |
| 3,073,149 | 1/1963 | Mongan | 73—38 |
| 3,328,588 | 6/1967 | Steinberg | 73—421.5X |
| 3,478,601 | 11/1969 | Niebergall | 73—432P.S. |

LOUIS R. PRINCE, Primary Examiner

D. M. YASICH, Assistant Examiner

U.S. Cl. X.R.

73—38